Patented Aug. 11, 1942

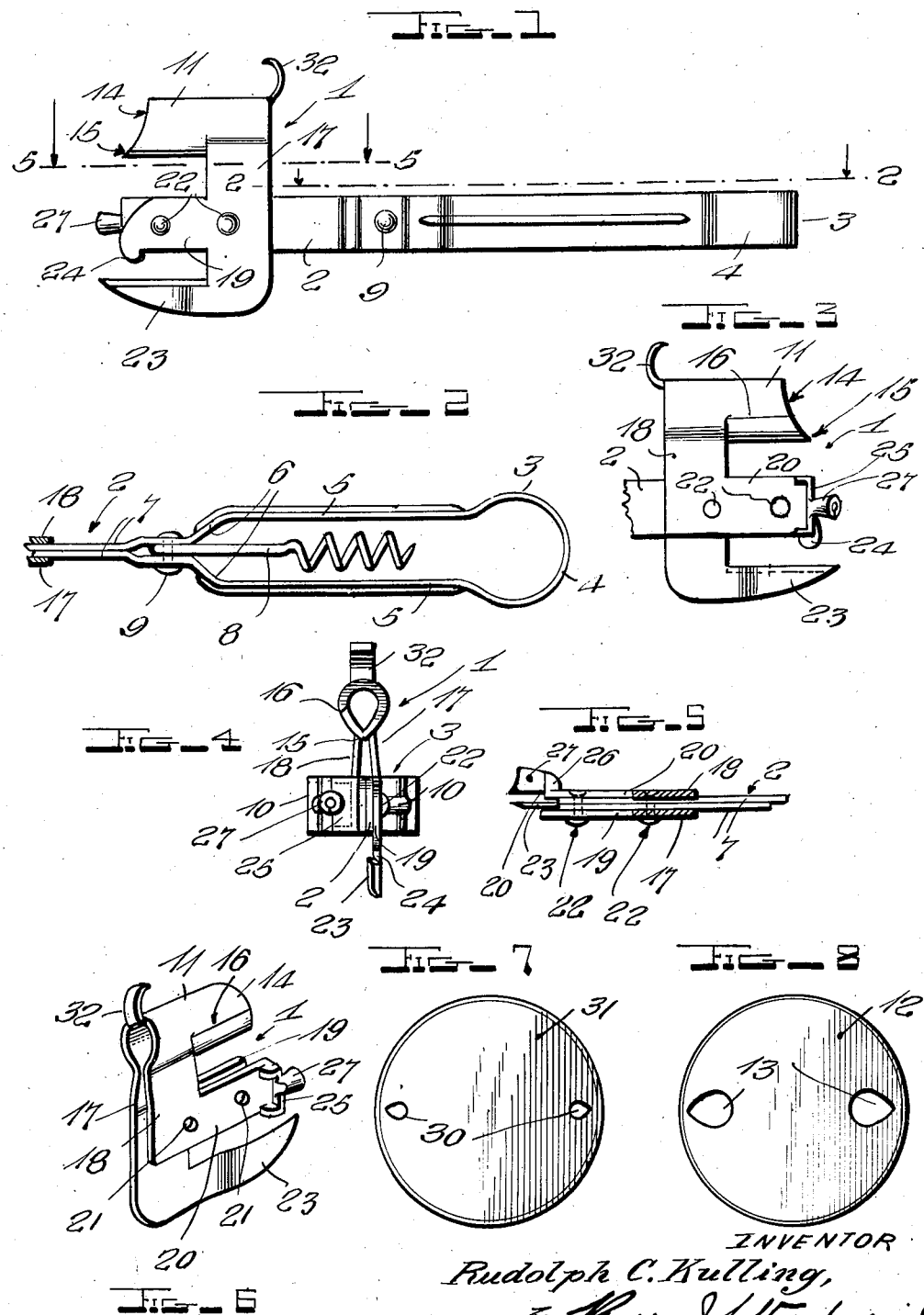

2,292,452

UNITED STATES PATENT OFFICE 2,292,452

KITCHEN IMPLEMENT

Rudolph C. Kulling, Chicago, Ill.

Application October 21, 1939, Serial No. 300,619

2 Claims. (Cl. 30—16)

This invention relates to kitchen implements and more particularly to a perforator for forming openings in the head of a can containing evaporated milk, fruit juices, beer or other liquids.

Another object of the invention is to provide an implement having its head provided with a cross bar or strip carrying a member serving as a perforator for forming holes in the head of a can and also carrying arms serving as a guide for the perforator.

Another object of the invention is to provide an implement wherein the forwardly projecting shank of the handle is firmly secured between arms of the head by rivets, one of which also serves to firmly mount the cross bar carrying the perforator for forming holes in large cans.

Another object of the invention is to provide an implement of this character which is simple in construction, strong and durable, and capable of being manufactured at low cost.

The invention is illustrated in the accompanying drawing, wherein:

Fig. 1 is a side elevation of the improved implement.

Fig. 2 is a view looking down on the handle portion of the implement, the view being taken on the line 2—2 of Fig. 1.

Fig. 3 is a view in elevation looking at the opposite side of the head from that shown in Fig. 1.

Fig. 4 is a view looking at the front end of the implement.

Fig. 5 is a fragmentary sectional view taken on the line 5—5 of Fig. 1.

Fig. 6 is a perspective view of the head portion of the implement.

Fig. 7 is a view looking down on a can having its head perforated to form a small pouring opening and an air inlet opening.

Fig. 8 is a similar view of a can with large openings.

This improved implement has a head 1 firmly mounted on the forward portion of the shank 2 of a handle 3. The handle is formed from a strip of stiff metal bent midway its length to form a semicircular rear portion 4 having arms 5 extending forwardly therefrom and, at the front ends of the arms, the end portions of the strip are bent toward each other, as shown at 6, and then bent to form the side portions 7 of the shank 2. A corkscrew 8 is pivotally mounted by means of a rivet 9 which not only pivotally mounts the cork screw but also serves as a fastener for the portions 7 of the handle forming strip through which it passes.

The head 1 is formed from a blank of stiff sheet metal, the intermediate portion of the blank being folded to form a tubular horizontally extending perforating member 11 for penetrating the head of a can 12 filled with evaporated milk, fruit juices, or the like, and forming large openings 13 therein. The front end 14 of the perforator is cut at an incline and, since the perforator is tapered toward its under portions, as shown in Fig. 4, a sharp point 15 is formed. It should be noted that edges of the metal forming the perforator meet along a side portion midway the depth thereof, as shown at 16. Therefore, strain exerted when forcing the front end of the perforator through the head of a can will not cause the perforator to be expanded or otherwise distorted. In view of the fact that the perforator is of substantially oval cross sectional outline, as shown in Fig. 4, the openings 13 will be shaped as shown in Fig. 8, and taper to points at their outer ends so that the liquid will flow freely from the can. It should also be noted that when the perforator is forced through the head of the can, the metal is displaced inwardly away from the outer end of the opening and obstructions which would be liable to interfere with flow of liquid from the can will be eliminated.

Arms 17 and 18 extend downwardly from opposite sides of the rear portion of the perforator and carry tongues 19 and 20 which project forwardly therefrom, openings 21 being formed in the tongues and the arms to receive rivets 22 by means of which the head is firmly secured to the shank 2 in straddling relation thereto, as shown in Figs. 4 and 5. A can-opening blade 23 projects forwardly from the lower end of the arm 17, which is longer than the arm 18, and the front end of the arm 19 is formed with a depending lug 24 to bear against the head of a can and cause the blade to easily cut through the head of the can during a can opening operation.

At its front end the tongue 20 is formed with a transversely extending lip 25 which carries a small perforator 27. This perforator projects forwardly from the lip and is employed as means for forming small openings 30 in a can 31, such as used for evaporated milk. In order to remove bottle caps, there has been provided a hook 32 formed from a strip which projects from the rear end of the perforator 11 and is curved longitudinally so that it may obtain a good grip under the crimped edge of a cap to be removed.

Having thus described the invention what is claimed is:

1. An implement of the character described comprising a handle having a forwardly extending shank, and a head carried by the forward portion of said shank and consisting of a hollow perforating member substantially elliptical in cross section and having its front end cut diagonally to provide cutting edges about its margins converging and intersecting to form a penetrating point, and arms extending downwardly from the rear portion of said perforating member in transverse spaced relation to each other and formed with forwardly projecting tongues, the arms and their tongues being secured against opposite side faces of the shank of said handle.

2. An implement of the character described comprising a strip of stiff metal folded midway its length to form a handle, end portions of the strip being bent to dispose them in face to face engagement with each other and form a shank of double thickness projecting forwardly from the handle, and a head carried by said shank and formed from a metal blank having a forwardly enlarged intermediate portion folded to form a tubular perforating member having its forward portion secured along one side and arms extending from the rear portion of the member in transverse spaced relation to each other, the arms being provided with forwardly extending tongues, the arms and their tongues being secured against opposite side faces of the shank and together therewith forming a guide for engaging a side portion of a can and directing downward movement of said member through a head of the can to puncture the same.

RUDOLPH C. KULLING.